United States Patent [19]

Whitehouse et al.

[11] 3,757,256

[45] Sept. 4, 1973

[54] SURFACE WAVE TRANSDUCERS WITH CANCELLATION OF SECONDARY RESPONSE

[75] Inventors: Harper John Whitehouse; Jeffrey M. Speiser, both of San Diego, Calif.

[73] Assignee: The United States of America as represented by the Secretary of the Navy

[22] Filed: Aug. 2, 1971

[21] Appl. No.: 168,252

[52] U.S. Cl. ................ 333/30 R, 333/72, 333/70 T
[51] Int. Cl. .......................... H03h 7/30, H03h 9/00
[58] Field of Search .................. 340/15; 333/30, 72

[56] References Cited

UNITED STATES PATENTS

| | | | |
|---|---|---|---|
| 3,680,008 | 7/1972 | Yamamoto | 333/72 X |
| 3,715,674 | 2/1973 | Bahr | 333/30 R X |
| 3,662,293 | 5/1972 | DeVries | 333/72 |
| 3,551,837 | 12/1970 | Speiser et al. | 333/30 |

*Primary Examiner*—Benjamin A. Borchelt
*Assistant Examiner*—A. M. Psitos
*Attorney*—Richard S. Sciascia et al.

[57] ABSTRACT

A surface wave device having a desired impulse response, comprising a substrate capable of propagating surface waves, and an input, or launch, transducer pair, each transducer being disposed upon the substrate in a parallel relationship, and each transducer including a pair of sets of parallel, linear, interdigitated, electrode elements, each set of elements being connected to a common bus bar. One transducer of the input transducer pair has its parallel elements weighted in accordance with an arbitrary weighting function $w_1(x)$, while the other transducer of the input transducer pair has its parallel elements weighted in accordance with the function $w_2(x)$, the two functions being related by $$|W_1(f)|^2 + |W_2(f)|^2 = \text{a constant},$$

wherein $W_1$, $W_2$, are the Fourier transforms of $w_1$, $w_2$, respectively. An output, or receive, transducer, aligned with one of the input transducers, also comprises a pair of sets of parallel, linear, interdigitated, electrode elements, each set of elements being connected to a common bus bar. Acoustic absorbers are disposed on the substrate, parallel to the elements of the transducers and between the transducers and the edges of the substrate.

9 Claims, 4 Drawing Figures

GENERAL TRANSVERSAL FILTER CONFIGURATION

PATENTED SEP 4 1973 3,757,256
SHEET 1 OF 2
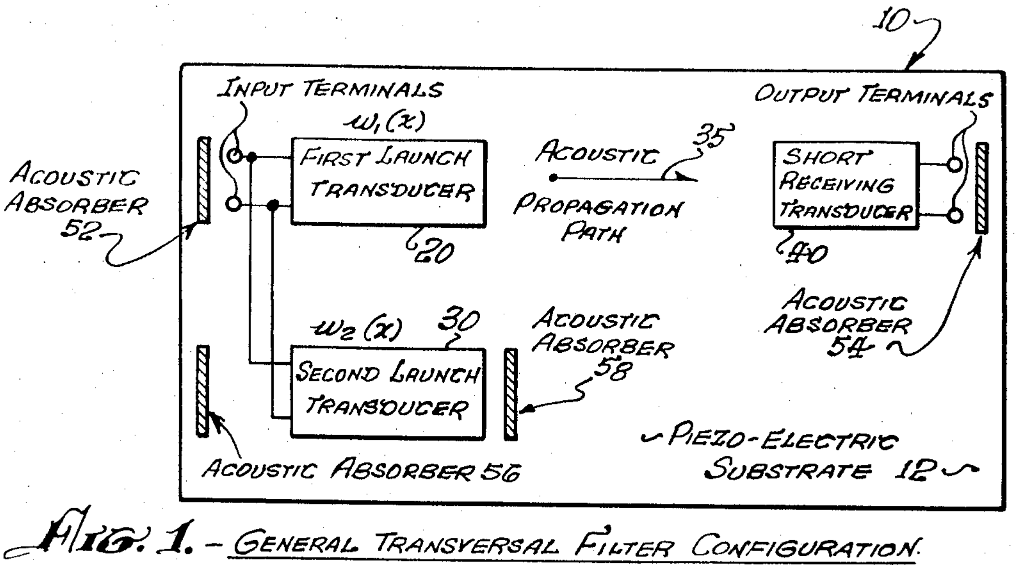
FIG. 1. – GENERAL TRANSVERSAL FILTER CONFIGURATION.
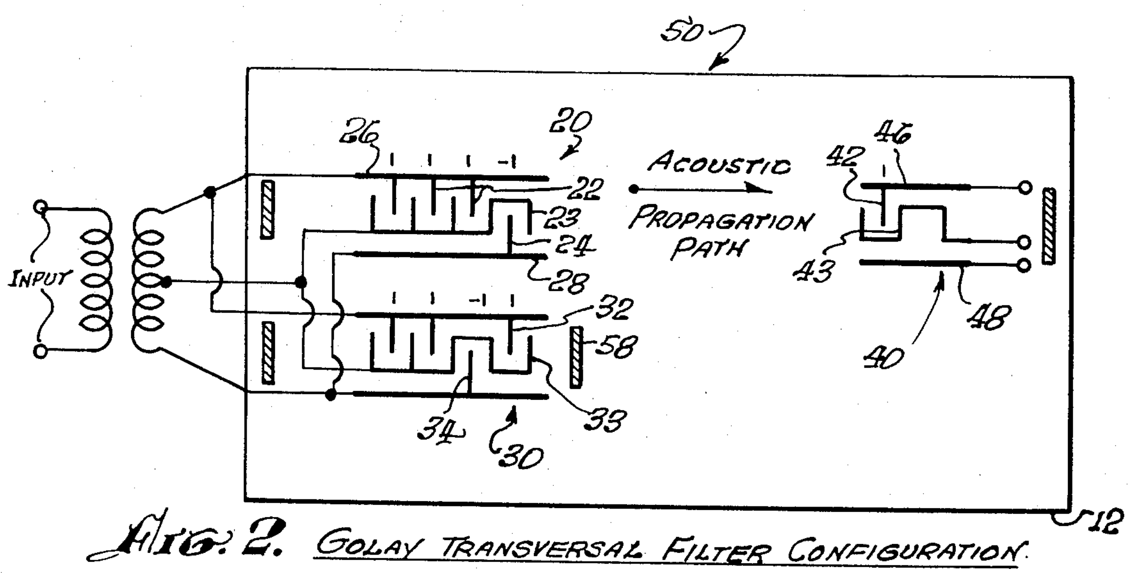
FIG. 2. GOLAY TRANSVERSAL FILTER CONFIGURATION.
INVENTORS.
HARPER JOHN WHITEHOUSE,
JEFFREY M. SPEISER,
By ERVIN F. JOHNSTON,
ATTORNEY.
JOHN STAN,
AGENT.

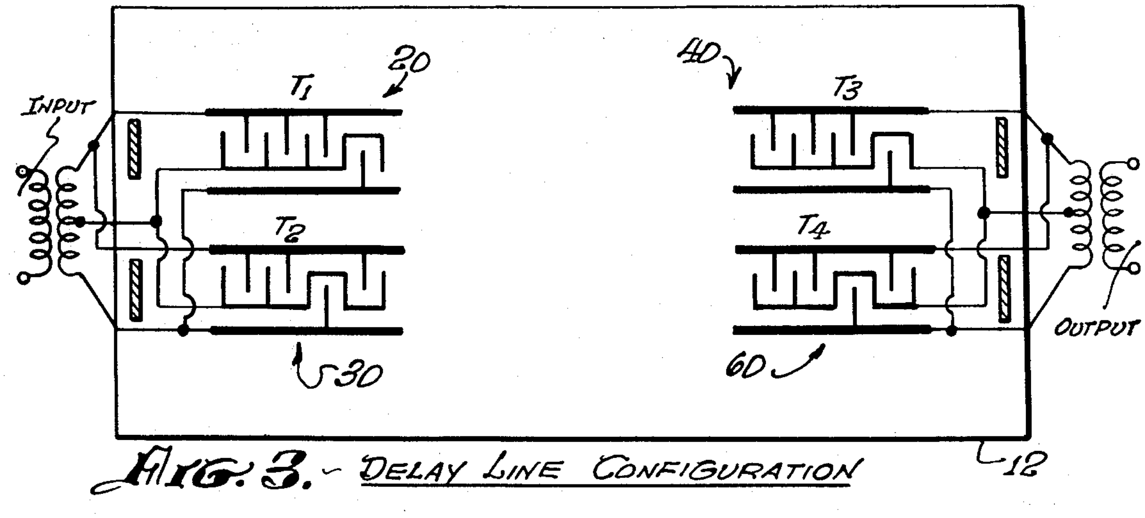
FIG. 3. - DELAY LINE CONFIGURATION
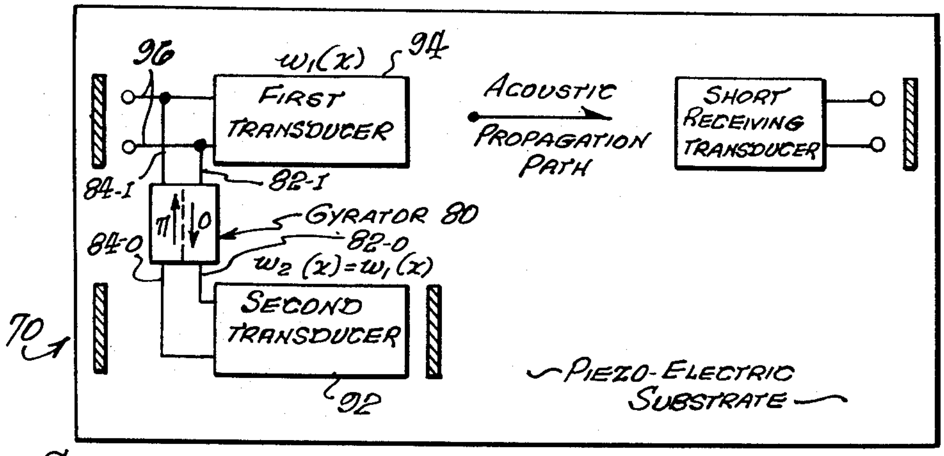
FIG. 4. - ALTERNATIVE TRANSVERSAL FILTER CONFIGURATION USING GYRATOR.

SURFACE WAVE TRANSDUCERS WITH CANCELLATION OF SECONDARY RESPONSE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to distributed-transducer acoustic wave devices for propagating surface waves, comprising a crystal substrate upon which is mounted at least one transducer set, including a pair of input transducers and at least one output transducer, with each transducer being aligned in the direction of wave propagation and each transducer including a pair of sets of interdigitated electrode elements. The interdigitations of the electrodes may be coded or may be uniformly spaced and alternating in sign. In some specific embodiments, the interdigitations of the electrode elements of the input transducers are configured to correspond to the members of a Golay complementary pair, described in more detail hereinbelow.

One of the objects of this invention is to provide for surface-wave transducers with specified impulse responses. Such transducers would be useful for delay-line memories, transversal filters, and other applications.

In low-coupling materials, such transducers may be constructed by making the transducer coding correspond to the desired response. However, if the trandsucer is sufficiently complicated, or if the coupling constants of the material are sufficiently large, this simple technique fails, because of multiple conversions of electrical energy to acoustic energy and vice-versa, which result in an undesired secondary response superimposed upon the desired response. One of the objects of this invention is the elimination of the undesired secondary response, thus permitting the construction of transducers with prescribed response, even when complicated transducer codings and/or high coupling materials are utilized.

The difference between low-coupling material and high-coupling material, with respect to surface wave transducers, is the following. Assume two transducers aligned on a common substrate. If a voltage be applied to one of the transducers, the launch transducer, it launches an acoustic signal across the transducer to the second receive, transducer, causing the generation of a voltage in the second transducer. Generally, the voltage induced in the receive transducer is much weaker that that generated in the launch transducer.

If the coupling between the two transducers be high, because the substrate is a high-coupling material, then the launch transducer would also receive the very same acoustic wave that it launches. This is so because the launch transducer generates an acoustic wave which propagates in each of two opposite directions.

Of course, this bidirectional wave propagation is true even of low-coupling substrate material, but the received, or perturbed, wave, in this case is much weaker than the primary wave. In the low-coupling case, the perturbation voltage is small, and can be ignored; in the high-coupling case, the perturbation voltage cannot be ignored. Controlling the perturbation voltage in high-coupling material appears to be the source of the problem with respect to transduction in high-coupling material, that is to say, the perturbation voltage has not been taken into account in the past.

In the prior art, surface-wave transducers with impulse response corresponding to the interdigitated finger coding have been limited in the number of allowable finger pairs. When the substrate is a low-coupling material such as quartz, the upper limit is of the order of several hundred fingers. For a high-coupling material such as lithium niobate, the use of even a few tens of fingers results in a transducer response significantly different from the finger coding.

Transducers using low-coupling materials suffer from high insertion loss, compared to similar transducers on high-coupling materials.

On the other hand, it has not been possible in the prior art to use high-coupling material to construct the complicated tranversal filters need for signal processing, because of the limitations on the allowable number of finger pairs which may be used in a transducer having a prescribed response.

SUMMARY OF THE INVENTION

The inputs of two surface-wave transducers disposed on a common substrate are electrically connected in parallel. The first transducer has weighting function $w_1(x)$ and the second transducer has weighting function $w_2(x)$. Apart from a scaling factor, $w_1$ will be the desired impulse response time-reserved. The weight function $w_2$ of the second transducer is chosen so that $$|W_1(f)|^2 + |W_2(f)|^2 = \text{constant}, \qquad (1)$$

where $W_k(f)$ is the Fourier transform of $w_k(x)$. Equivalently, $w_2(x)$ is chosen so that $$\int w_1(x)w_1(x+u)dx + \int w_2(x)w_2(x+u)dx = \delta(u) \qquad (2),$$

where $\delta$is the Dirac delta function. If the transducers consist of uniformly spaced fingers, the above autocorrelation function may be expressed in discrete form, in terms of sums of like products. For example, given a sequence of discrete terms $c_1, c_2 \ldots c_n$, the autocorrelation function is $$\sum_{k=1}^{k=n-j} c_k c_{k+j} \quad 0 \leq j \leq n-1 \qquad (3)$$

The sequence of discrete terms consists of a series of Dirac delta functions having weighted values $c_1, c_2, \ldots c_n$. The discrete auto-correlation function will give the sequence of weights to the delta function in the ordinary auto-correlation function of the original delta function train.

At the maximum shift of the autocorrelation function described by Eq. (3), the summation is from $k$=1 to $k$=$n$−($n$−1), or from $k$=1 to $k$=1, meaning that only a single term is involved in the correlation. Eq. (3) then becomes $$\sum_{k=1}^{k=1} c_1 c_{1+(n-1)} = \sum_{k=1}^{k=1} c_1 c_n.$$

At the lowest limit, with $j$=0, there is a minimum shift, and Eq. (3) becomes $$\sum_{k=1}^{k=n} c_k c_k,$$

and there are $n$ terms in the summation.

Eq. (3) as described is valid for $j=0$ through $j=n-1$. The equation will be valid for negative shifts also if the upper summation limit is changed from $(n-j)$ to $(n-|j|$ 9). Eq. (3) is then valid from $-(n-1)$ up through $+(n-1)$.

The mode of operation of the invention is as follows: Since the device is linear and time-invariant, it is fully characterized by its impulse response. Let an electrical impulse be applied to the input of the parallel combination of the two transducers, for example by a voltage source with finite source impedance. In each transducer, an acoustic wave is launched to the left, and a second wave is launched to the right.

Two new techniques are used for obtaining the required cancelling voltage. The first technique utilizes a second transducer in the input stage whose weight function has the appropriate autocorrelation function. The second technique utilizes a second transducer identical to the first transducer, together with a nonreciprocal device between them providing a 180° phase shift in one direction and no phase shift in the other direction.

As stated hereinabove, when the coupling is sufficiently high, a spatially extended launch transducer will receive the very signal it is launching, and thus suffer a perturbation of its input voltage and hence its output. This phenomenon has also been examined in the time domain, and it has been shown that the voltage perturbation depends in a simple way upon the autocorrelation function of the transducer's weight sequence. By connecting a transducer electrically in parallel with its generalized complement, the perturbation voltage may be made to vanish, resulting in the impulse response of the transducer having the same shape as would have been obtained by using the same coding on a low-coupling material.

The essential new feature of the invention is the elimination of the undesired perturbation voltage produced by the generated acoustic wave interacting with its own launch transducer, resulting in an impulse response for a high-coupling material similar in shape to that which would be obtained in the low-coupling case.

In this invention, the parallel combination of the two transducers, together with the choice of the weight function of the second transducer, insures the cancellation of the two voltage perturbations, and hence the net acoustic wave launched to the right by the first transducer is a clean time-reversed replica of its weight function $w_1$.

If the weight function $w_1$is one member of a pair of Golay complementary series, then the required weight function $w_2$ for the second transducer is exactly the second member of the complementary series pair.

For more general weight functions such as linear Fm, or "chirp" codes, Barker codes, Huffman codes, and other frequently used echo location signals, the required weight function for the second transducer may be found using eqs. (1) and (2), hereinabove.

Chirp, Barker and Huffman codes are described in the book entitled "Radar Signals," by Charles E. Cook and Marvin Bernfeld, published by the Academic Press in 1967.

More specifically, continuous-time chirp codes are described in this reference, while discrete-time chirps are discussed in the book entitled "Digital Processing of Signals," by Bernard Gold and Charles N. Rader, published by McGraw - Hill in 1969.

Barker codes are described in detail by R. H. Barker, "Group synchronizing of binary digital systems," in Communication Theory, W. Jackson, Ed. London: Butterworth, 1953, pp. 273–287.

Huffman codes are described in detail by D. A. Huffman, in the article entitled "The generation of impulse-equivalent pulse trains," IRE Trans. Information Theory, vol. IT–8, pp. S10–S16, 1962.

Inasmuch as the Golay series plays an important role in this disclosure, reference is hereby directed to his classic paper entitled "Complementary Series," which appeared in the April 1961 issue of the IRE Transactions of Information Theory, pages 82–87.

OBJECTS OF THE INVENTION

An object of the invention is to provide a surface wave device with a specified impulse response.

Another object of the invention is to provide a surface wave device which minimizes undesired secondary responses, even when complicated transducer codings and high coupling materials are used.

Yet another object of the invention is to provide a surface wave device in the form of a complicated transversal filter on high-coupling material.

Still another object of the invention is to provide a surface wave device not limited as to the number of allowable electrode elements.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a block diagram of a transversal filter configuration in a general form.

FIG. 2 is a diagrammatic view of a more specific implementation of the embodiment shown in FIG. 1, using a Golay complementary pair.

FIG. 3 is a diagrammatic view of a delay line comprising two Golay complementary pairs.

FIG. 4 is a block diagram of a transversal filter configuration alternative to the one shown in FIG. 1, and using a reciprocal device in the form of a gyrator.

DESCRIPTION OF THE PREFERRED EMBODIMENTS

Referring now to FIG. 1, this figure shows an embodiment in a very broad form of a surface wave device 10 having a desired impulse response, comprising a substrate 12 capable of propagating surface waves, and an input, or launch, transducer pair, 20 and 30, each transducer being disposed upon the substrate in a parallel relationship. As is shown in detail in FIG. 2, each transducer 20 and 30 includes a pair of sets 22 and 24 of parallel, linear, interdigitated, electrode elements, each set of elements being connected to a common bus bar, 26 and 28 respectively.

One transducer, for example, launch transducer 20, of the input transducer pair has its parallel elements 22 and 24 weighted in accordance with an arbitrary weighting function $w_1(x)$, while the other launch transducer 30 of the input transducer pair has its parallel elements 32 and 34 weighted in accordance with the function $w_2$, the two functions being related by the function, $$|W_1(f)|^2 + |W_2(f)|^2 = \text{a constant},$$

where $W_1$ and $W_2$ are the Fourier transforms of $w_1$ and $w_2$, respectively.

As is shown in FIG. 2, the surface device 50 further comprises an output, or receive, transducer 40, aligned with one of the input transducers, the first launch transducer 20. Receive transducer 40 includes a single-element electrode 42 connected to a bus bar 46.

Acoustic absorbers 52, 54, 56 and 58 are disposed on the substrate 12, parallel to the elements of the transducers 20, 30, and 40 and between the transducers and the edges of the substrate.

If the electric field produced by a transducer element is entirely contained within the boundaries of that element, then the net electric field is a superposition of spatially separated terms, with each term corresponding to a single transducer element. This condition is satisfied by the "field-delineated" transducer elements shown in FIG. 2, the field-delineating electrode being designated by reference numerals 23, 33, and 43.

The embodiment 50 shown in FIG. 2 is used as a transversal filter whose impulse is the weight function of upper left launch transducer 20. This necessitates use of the absorber 58 to the right of the lower launch transducer 30, in addition to the absorber 56 at the left of this transducer. In this manner, propagation of an acoustic surface wave in the lower channel to the right of transducer 30 is effectively blocked.

The weight function for the upper launch transducer 20 in FIG. 2 is the Golay code 1, 1, 1, −1. It follows that one way of building a transversal filter matched to this weight function is to take the transducer structure 30 shown in FIG. 2, make its electrode configuration the complement of that of transducer 20, and add absorbers 56 and 58 at the left and right hand sides of it. By this means, cancellation of the back emf is achieved, because of the parallel connection of the upper launch transducer 20 and its complementary transducer 30, and all of the acoustic propagation will take place in the upper path 35 only. An acoustic wave which is a copy of, or corresponds to, the coding on the upper launch transducer 20 propagates rightwardly to receive transducer 40, in response to an impulse signal applied to the launch transducer 20. The output therefore corresponds to the weight function just described.

The most general version of the complementary cancellation technique would involve four transducers, $T_1$ on the upper left, $T_2$ on the lower left, $T_3$ on the upper right and $T_4$ on the lower right. Launch transducers $T_1$ and $T_2$ are connected together in parallel on the launch end, then as long as transducers $T_1$ and $T_2$ satisfy Eqs. (1) and (2), given hereinabove, cancellation of the back emf of the launch transducers will occur. There may or may not be cancellation of the back emf at the receive transducers $T_3$ and $T_4$. However, reduction of the back emf at the receive transducers $T_3$ and $T_4$ may be obtained, for example by terminating them in a low-impedance load.

If this be done, absorbers may be limited to the outer edges only of the substrate. Propagation in the upper path results in $T_1$ correlated with $T_3$, symbolically, $T_1 * T_3$, and in the lower path, $T_2 * T_4$. Therefore, the input response of the device is $T_1 * T_3 + T_2 * T_4$.

A specific implementation is shown in FIG. 3, with transducers 20, 30, 40, and 60 corresponding to transducers $T_1$, $T_2$, $T_3$, and $T_4$, respectively. It will be noted that transducers 20 and 30, and transducers 40 and 60, form the two members of a Golay complementary pair, having the same coding as the Golay transducer pair 20 and 30 shown in FIG. 2. It will be noted that the acoustic absorber stripe 58 shown in FIG. 2 is lacking in FIG. 3.

In an alternative embodiment, for example, the one shown in FIG. 2, absorbers 56 and 58 may be placed about the $T_2$ transducer 30 one on each side. If this be done, then the output becomes $T_1 * T_3$.

Different specilizations of this general structure would result in the Golay structure having a pulse-in pulse-out response, or result in different types of transversal filters.

If a transducer were in isolation, that is, just driven by itself, that is, if only one transducer is present, rather than a pair, then the perturbation voltage produced is proportional to the autocorrelation function of the transducer coding, or the impulse response. Assuming an electrical impulse, a Dirac delta function, be applied, the perturbation voltage is zero for negative time, since the system is causal, that is, there can be no response before the input, but during positive time the response is proportional to the autocorrelation function of the transducer weight function.

Therefore, what is needed is a cancelling voltage which is proportional to the negative of the autocorrelation function. If two transducers be disposed on a substrate having the right configuration so that their weight functions have equal but opposite autocorrelation function side lobes, where they are connected in parallel the two perturbation voltages cancel.

Golay complementary sequences are not the only sequences which have the property of having autocorrelation functions which have side lobes which are equal in magnitude but opposite in sign. There are other sequences, which are not binary, which have the same property. A binary sequence, in the context of interdigitated transducers is a sequence of +1's and −1's.

However, there may be more general codings. For example, in radar, "chirps," or linear frequency-modulation signals, are often used. The point is that one could find a signal whose autocorrelation function has side lobes which are exactly the negative of the autocorrelation function of a chirp. This information would be useful in determining the manner in which the second, receive, transducer should be configured, namely, in such a way as to complement the chirp, in order to get rid of the perturbation voltage.

In more detail, assume the principles of this invention are to be used with a chirp code. This code would correspond to the function $w_1(x)$, which has the Fourier transform $W_1(f)$. By use of Eq. (1), $$|W_1(f)|^2 + |W_2(f)|^2 = \text{a constant},$$

first the Fourier transform $W_2(f)$ may be calculated, and then $w_2(x)$. As would be known to one skilled in the art, the constant on the right side of the equation would have a value equal to or greater than the maximum magnitude attained by $W_1(f)^2$, so that $|W_2(f)|^2$ and therefore $W_2(f)$ be real. Any convenient phase function may be associated with $W_2(f)$.

Taking the inverse Fourier transform of $W_2(f)$ results in $w_2(x)$. Sampling $w_2(x)$ at the Nyquist rate results in the discrete sequence to be used for the surface wave device coding.

Specific implementations of chirp, Barker and Huffman codes are not readily derived analytically in closed form, but usually require computer calculations.

For transversal filtering, difficulty may be experienced in calculating the proper configuration for the matching launch filter. This difficulty may be eliminated through the use of a non-reciprocal device in the form of a differential phase shifter, also known as a gyrator. An embodiment 70 utilizing a gyrator 80 is shown in FIG. 4. A gyrator 80 is a two-port device. A signal entering one port, input port 82–I, comes out of the other port, output port 82–O, with no phase shift. A signal entering the other port 84–I comes out of the second port 84–O with a 180° phase shift.

When using a gyrator 80, the second transducer 92 is made identical to the first transducer 94. The two transducers 92 and 94 see the same electrical driving signal, and hence launch identical acoustic waves, and if not connected together would develop identical secondary, perturbation, voltages. The phase reversal introduced by the gyrator 80, however, results in the undesired cancelling at the terminals 96 of the first transducer 94.

If the length of the individual electrodes, 22 and 24 in FIG. 2, is only a few wavelengths long, then isolator stripping (not shown) disposed between transducers 20 and 30 would be required. If the length of the individual electrode elements 22 and 24 is much greater than this, then the isolator stripping would not be required. The isolator stripping would be used when it is desired to utilize the substrate 12 area to its fullest extent, the fingers 22 and 24 being made relatively short in this case. The acoustic wave device 10 may work without the isolator stripping as long as the individual electrode elements are long enough so that they form sharp acoustic beams.

Obviously many modifications and variations of the present invention are possible in the light of the above teachings. It is therefore to be understood that within the scope of the appended claims the invention may be practiced otherwise than as specifically described.

What is claimed is:

1. A surface wave device having a desired impulse response, comprising:

a substrate capable of propagating surface waves;

an input, or launch, transducer pair, connected in parallel, each transducer being disposed upon the substrate in a parallel relationship, and each transducer including a pair of sets of parallel, linear, interdigitated, electrode elements, each sets of elements being connected to a common bus bar;

an output, or receive, transducer, aligned in the same propagation path with one of the input transducers, also comprising a pair of sets of parallel, linear, interdigitated, electrode elements, each set of elements being connected to a common bus bar; and acoustic absorbers, disposed on the substrate, parallel to the elements of the transducers and between the transducers and the edges of the substrate;

the pair of input transducers so configured one with respect to the other that, with an input electrical signal applied to the bus bars, the effects of multiple conversions of electrical energy to acoustic energy and vice versa are diminished, even on high-coupling substrates.

2. A surface wave device according to claim 1 wherein one transducer of the input transducer pair has its parallel elements weighted in accordance with an arbitrary weighting function $w_1(x)$;

the other transducer of the input transducer pair has its parallel elements weighted in accordance with the function $w_2(x)$, the functions being related by the function, $$|W_1(f)|^2 = |W_2(f)|^2 = \text{a constant},$$

where $W_1$, $W_2$, are the Fourier transforms of $w_1$, $w_2$, respectively.

3. A surface wave device according to claim 2, wherein the interdigitated electrodes of the input transducers are weighted according to the configurations of the members of a Golay complementary pair.

4. A surface wave device according to claim 2, wherein the output transducer comprises several uniformly coded electrode elements.

5. A surface wave device according to claim 3, wherein the output transducer comprises a pair of transducers substantially identical to and aligned with the input transducers.

6. A surface wave device according to claim 2, wherein the interdigitated electrodes of the input transducers are weighted according to a chirp code for one of the transducers and the complement of the chirp code for the other transducer.

7. A surface wave device according to claim 2, wherein the interdigitated electrodes of the input transducers are weighted in accordance with a Huffman code.

8. A surface wave device according to claim 2, wherein the interdigitated electrodes of the input transducers are weighted in accordance with a Barker code.

9. A surface wave device according to claim 1, wherein the two input transducers are identical; and further comprising:

a gyrator interposed between the inputs to the two launch transducers.

* * * * *